UNITED STATES PATENT OFFICE.

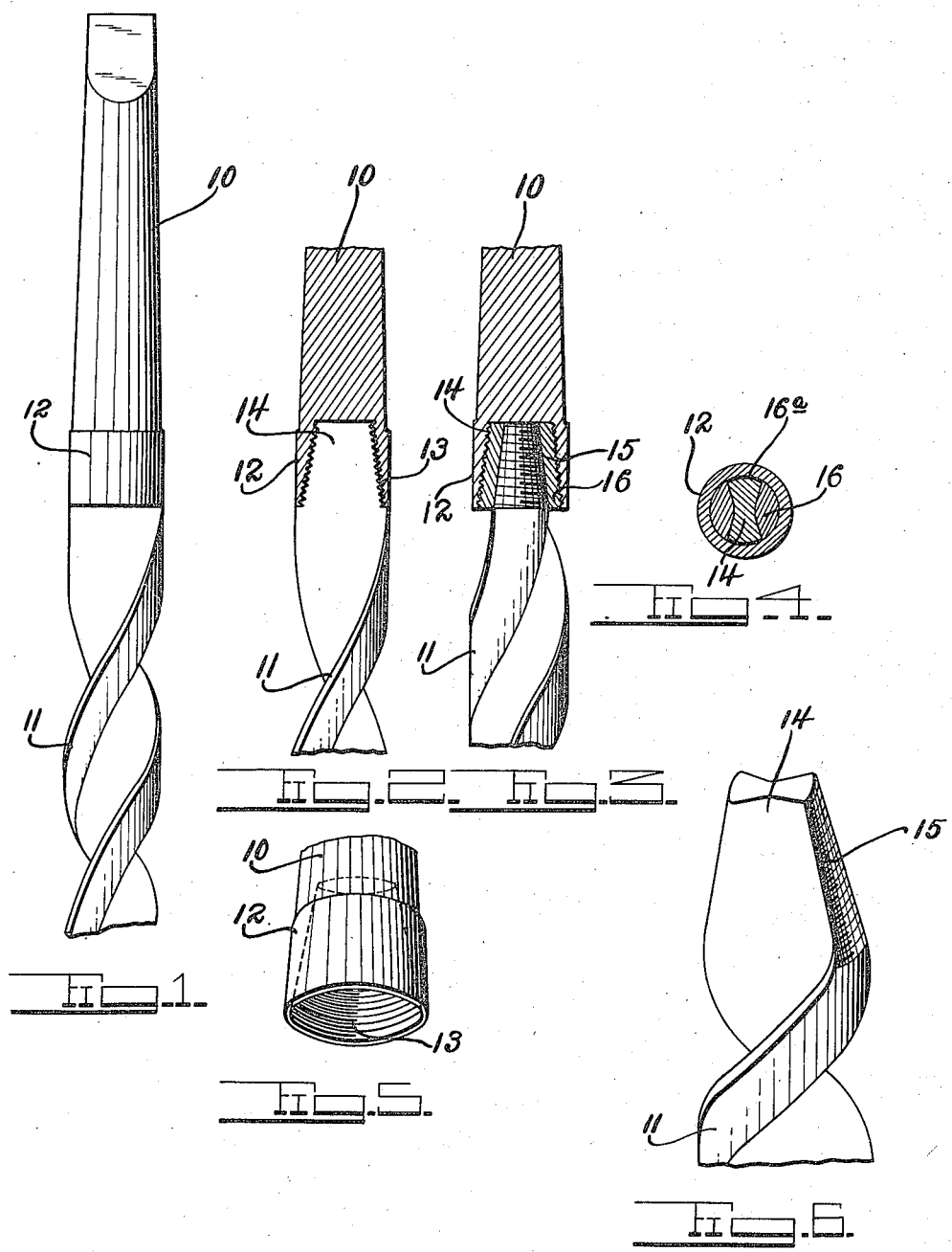

JOHN B. MOORE, OF LATROBE, PENNSYLVANIA.

TOOL.

1,191,717. Specification of Letters Patent. Patented July 18, 1916.

Application filed October 15, 1915. Serial No. 56,018.

*To all whom it may concern:*

Be it known that I, JOHN B. MOORE, a citizen of the United States, residing at Latrobe, in the county of Westmoreland and State of Pennsylvania, have invented new and useful Improvements in Tools, of which the following is a specification.

This invention is an improved metal cutting tool of the type known as twist drills. Owing to the excessive cost of high speed steel, of which twist drills are constructed, it has been found desirable to utilize metal of a lower grade in the construction of the shank thereof, and many attempts have been made to produce a successful twist drill of this type. Experience has proven, however, that in most instances, drills thus constructed are weak at the point of union of the two metals, and are usually unable to withstand the strains at that point, or else, the process by which the parts are united, requires extraordinary skill in carrying the same out, and as a consequence the cost of manufacture is prohibitive.

One of the objects of the invention is to overcome the objections above pointed out, by providing a tool formed of a body of high grade material, and a shank of lower grade material, united in such a manner that it is as strong at the point of union as at any other part, if not stronger.

A further object is to provide an improved joint for the high grade steel and the low grade steel, by means of which the parts of the tool may be integrally united without necessitating the employment of highly skilled operators.

The invention will be hereinafter fully set forth and particularly pointed out in the claims.

In the accompanying drawing: Figure 1 is a side view of a twist drill constructed in accordance with the invention. Figs. 2 and 3 are longitudinal sectional views taken at right angles to each other. Fig. 4 is a transverse sectional view. Figs. 5 and 6 are detailed views of the socket and of the body, respectively before uniting.

Referring to the drawing, 10 designates the shank and 11 the body of a twist drill, said shank being formed of low grade steel, and the body of high grade steel. Said shank is provided at one end with a longitudinal socket 12 provided with a tapered wall which is provided with screw threads 13. The body of the drill is preferably formed of a piece of metal approximately X-shaped in cross section, and twisted in a manner well known in the art. Said body is tapered at one end as indicated at 14 to conform to the taper of the socket 12, the edges of the tapered portion of the drill body being provided with screw threads 15, complemental to the threads 13. In practice the tapered end 14 is screwed into the socket 12, the threads 13 and 15 serving as transverse shoulders for holding the two members against longitudinal separation, and then the space surrounding said tapered end 14, between the latter and the wall of the socket, is filled in with a suitable brazing material 16, which works in between the threaded portions of the parts, as indicated at 16ª, thereby uniting the shank and the body in one integral piece. If desired, the spaces between the sides of the tapered portion 14 and the wall of the socket 13, may be partially filled by filler pieces 17, of cheap metal, to effect a saving of the brazing material, such brazing material as is used, serving to fill the interstices between the filler pieces 17 and the tapered portion 14, and between said elements and the wall of the socket. It will be noted that the screw threads 13 and 15 not only serve to hold the body and the shank in proper relation during the brazing process, but they also serve to greatly increase the areas of the contacting portions of the body and the socket, covered by the brazing material, thereby materially strengthening the joint. Likewise the brazing of the threaded portions together reinforces the parts against the twisting strains.

It will be understood that while the novel features of the invention are specifically shown and described as applicable to twist drills, they are not limited in this particular, but may be applied to any other analogous type of tool, in which a body of high grade metal is attached to a shank of low grade metal, without departing from the spirit of the invention.

Having thus explained the nature of my invention, and described an operative manner of constructing and using the same, although without attempting to set forth all of the forms in which it may be made, or all of the forms of its use, what I claim is:—

1. An improved tool comprising a shank of low grade metal having a socket in one end thereof, a body of high grade metal having one end inserted into said socket, the inserted portion of said body and the interior wall of said socket having complemental transverse shoulders for preventing longitudinal separation, and a body of brazing material wholly surrounding the inserted portion of said body and filling all intervening space between the same and the interior wall of the socket.

2. An improved tool comprising a shank of low grade metal having a socket in one end thereof, said socket having internal screw threads, a body of high grade metal having one end inserted into said socket, the inserted portion of said body being threaded to engage the threads of said socket, and a body of brazing material surrounding the inserted portion of said body, and filling all intervening space between the same and the wall of the socket, and including the space between the inter-engaged threaded portions.

3. An improved tool comprising a shank of low grade metal having a tapered socket in one end, said socket being internally threaded, a body of high grade metal having one end tapered to fit within said socket, the tapered end of said body being threaded to engage the threads of said socket, and a body of brazing material wholly surrounding the inserted portion of said body and filling all intervening space between the same and the wall of the socket and including the space between the interengaged threaded portions.

4. An improved tool comprising a shank of low grade metal having a socket in one end, a body of high grade metal having one end inserted into said socket, the inserted portion of said body being of a cross section to leave spaces between said body and the wall of said socket, the inserted portion of the body and the wall of the socket having complemental means for preventing longitudinal displacement, and a body of brazing material wholly surrounding the inserted portion of said body and filling all intervening space between the same and the wall of the socket.

5. An improved tool comprising a shank of low grade metal having a socket in one end thereof, a body of high grade metal having one end of X-shape in cross section inserted into said socket, the inserted portion of said body and the wall of said socket having complemental means for preventing longitudinal displacement, and a body of brazing material wholly surrounding the inserted portion of said body, and filling the space intervening between the same and the wall of the socket.

6. An improved tool comprising a shank of low grade metal having a socket in one end thereof provided with internal screw threads, a body of high grade metal having one end of approximately X-shape in cross section inserted into said socket, the inserted portion of said body being threaded to engage the threads of said socket, and a body of brazing material, surrounding the inserted portion of said body, and filling all intervening space between the same and the wall of the socket, and including the space between the interengaged threaded portions.

In testimony whereof I have hereunto set my hand in presence of two subscribing witnesses.

JOHN B. MOORE.

Witnesses:
JAS. T. HUGHES,
J. R. CONRAD.